US011657158B2

(12) United States Patent
Samuel et al.

(10) Patent No.: US 11,657,158 B2
(45) Date of Patent: May 23, 2023

(54) SYSTEMS AND METHODS FOR EXTENDING BOOT SECURITY TRUST CHAINING TO STATE CHANGES BETWEEN BOOT SESSIONS

(71) Applicant: Dell Products L.P., Round Rock, TX (US)

(72) Inventors: Balasingh P. Samuel, Round Rock, TX (US); Richard M. Tonry, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 207 days.

(21) Appl. No.: 17/328,466

(22) Filed: May 24, 2021

(65) Prior Publication Data

US 2022/0374522 A1     Nov. 24, 2022

(51) Int. Cl.
| | | |
|---|---|---|
| *G06F 21/57* | (2013.01) | |
| *G06F 21/54* | (2013.01) | |
| *G06F 21/64* | (2013.01) | |
| *G06F 21/72* | (2013.01) | |
| *G06F 21/55* | (2013.01) | |

(52) U.S. Cl.
CPC ............ *G06F 21/575* (2013.01); *G06F 21/54* (2013.01); *G06F 21/554* (2013.01); *G06F 21/64* (2013.01); *G06F 21/72* (2013.01)

(58) Field of Classification Search
CPC .... G06F 8/65; G06F 21/54; G06F 21/55–554; G06F 21/57–575; G06F 21/64; G06F 21/72
See application file for complete search history.

(56) References Cited

U.S. PATENT DOCUMENTS

| | | | | |
|---|---|---|---|---|
| 2011/0099627 | A1* | 4/2011 | Proudler | G06F 21/57 711/E12.001 |
| 2017/0237560 | A1* | 8/2017 | Mueller | G06F 21/72 713/168 |

FOREIGN PATENT DOCUMENTS

EP          2069992 B1 *  6/2009   ........... G06F 21/554

* cited by examiner

*Primary Examiner* — Kevin Bechtel
(74) *Attorney, Agent, or Firm* — Jackson Walker L.L.P.

(57) ABSTRACT

A method may comprise, on a basic input/output system (BIOS), executing a hardware attestation verification application configured to: (a) during a first boot session of the information handling system comprising the BIOS, execute a first stage of an update to the information handling system and securely record a platform state record associated with beginning of execution of a second stage of the update; and (b) during a second boot session of the information handling system: (i) obtain the platform state record; (ii) compare the platform state record to an actual platform state during boot process of the second boot session; and (iii) if the platform state record matches the actual platform state during boot process of the second boot session, permit execution of the second state of the update.

18 Claims, 3 Drawing Sheets

SYSTEMS AND METHODS FOR EXTENDING BOOT SECURITY TRUST CHAINING TO STATE CHANGES BETWEEN BOOT SESSIONS

TECHNICAL FIELD

The present disclosure relates in general to information handling systems, and more particularly to extending boot security trust chaining to state changes between boot sessions in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An existing information handling system may utilize measurements of Platform Configuration Registers (PCRs) of a Trusted Platform Module (TPM) to track platform state during boot. This state can be used to verify that a configuration of the information has not changed between boot sessions. Such measurements help to establish a trusted state of the hardware for firmware and software to utilize as part of the software trust chaining, as well as the device trusted foundation.

However, in existing approaches, for complex tasks, such as multi-step device configuration changes, or device firmware update that requires multiple boots, trust chaining does not span multiple boots. The lack of trust chain linking between boot sessions presents a potential exploit opportunity for adversaries to discover vectors for attacking the system, and opportunities to create attack vectors, such as a denial-of-service attack (DoS). Thus, the lack of trust chain between boot sessions may present an attractive target for malicious activity. Malicious actors may emulate a state change (for example, firmware update boot mode or other exception boot modes) from a previous boot session and create an opportunity to exploit weak points in the boot flow to increase the likelihood of the information handling system being breached or compromised. For complex system updates, or for multistep firmware scripts that must execute early in power-on/self-test to mitigate security vulnerabilities, and/or to return the system to a trusted configuration, it may be required to order operations across boots and the actions of subsequent boots based on a configuration or state change from the previous boot.

SUMMARY

In accordance with the teachings of the present disclosure, the disadvantages and problems associated with ensuring security of an information handling system across boot sessions may be reduced or eliminated.

In accordance with embodiments of the present disclosure, an information handling system may include a processor, a cryptoprocessor communicatively coupled to the processor, and a basic input/output system (BIOS) comprising boot firmware configured to be the first code executed by the processor when the information handling system is booted and/or powered on and executed prior to execution of an operating system of the information handling system, the BIOS embodied in non-transitory computer-readable media communicatively coupled to the processor and configured to, when loaded and executed by the processor: (a) during a first boot session of the information handling system, execute a first stage of an update to the information handling system and securely record a platform state record associated with beginning of execution of a second stage of the update; and (b) during a second boot session of the information handling system: (i) obtain the platform state record; (ii) compare the platform state record to an actual platform state during boot process of the second boot session; and (iii) if the platform state record matches the actual platform state during boot process of the second boot session, permit execution of the second state of the update.

In accordance with these and other embodiments of the present disclosure, a method may comprise, on a basic input/output system (BIOS) comprising boot firmware configured to be the first code executed by a processor when an information handling system is booted and/or powered on and executed prior to execution of an operating system of the information handling system, executing a hardware attestation verification application configured to: (a) during a first boot session of the information handling system comprising the BIOS, execute a first stage of an update to the information handling system and securely record a platform state record associated with beginning of execution of a second stage of the update; and (b) during a second boot session of the information handling system: (i) obtain the platform state record; (ii) compare the platform state record to an actual platform state during boot process of the second boot session; and (iii) if the platform state record matches the actual platform state during boot process of the second boot session, permit execution of the second state of the update.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to, during execution of a basic input/output system comprising boot firmware configured to be the first code executed by the processor when an information handling system is booted and/or powered on and executed prior to execution of an operating system of the information handling system: (a) during a first boot session of the information handling system comprising the BIOS, execute a first stage of an update to the information handling system and securely record a platform state record associated with beginning of execution of a second stage of the update; and (b) during a second boot session of the information handling system: (i) obtain the platform state record; (ii) compare the platform state record to an actual platform state during boot process of the second boot session; and (iii) if the platform state record matches the actual platform state during boot process of the second boot session, permit execution of the second state of the update.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
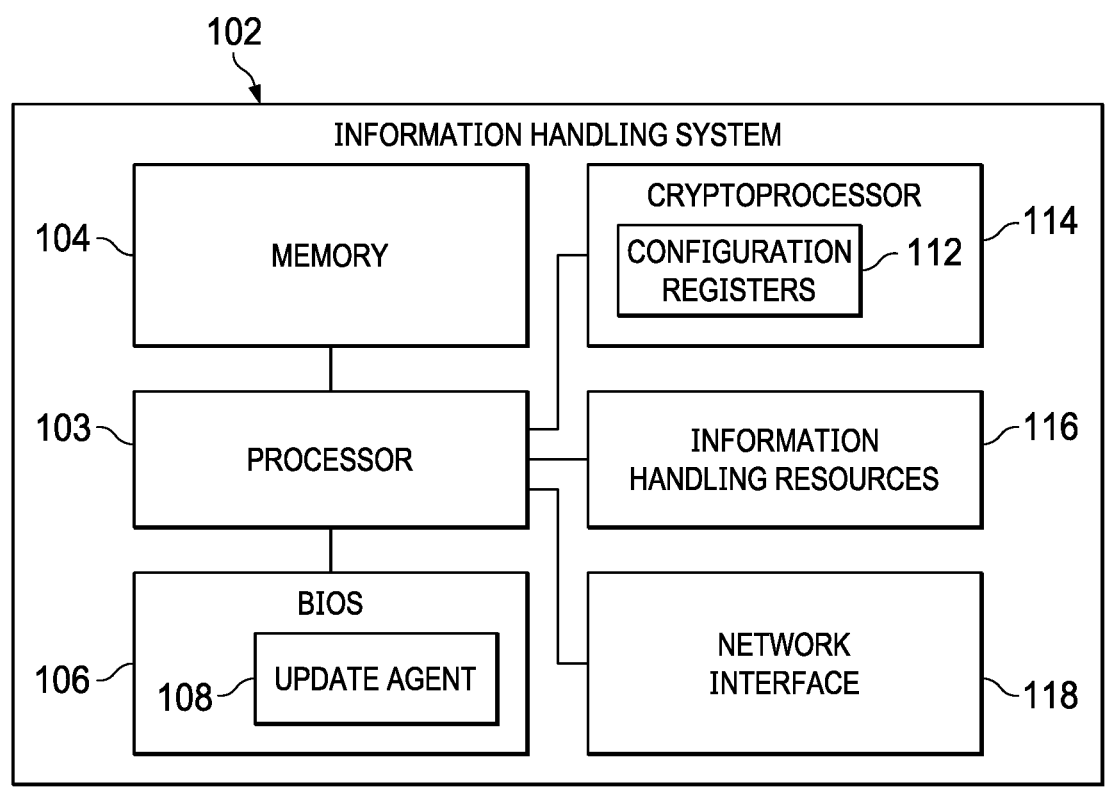
FIG. 1 illustrates a block diagram of an example information handling system, in accordance with embodiments of the present disclosure.
Figure 2A:
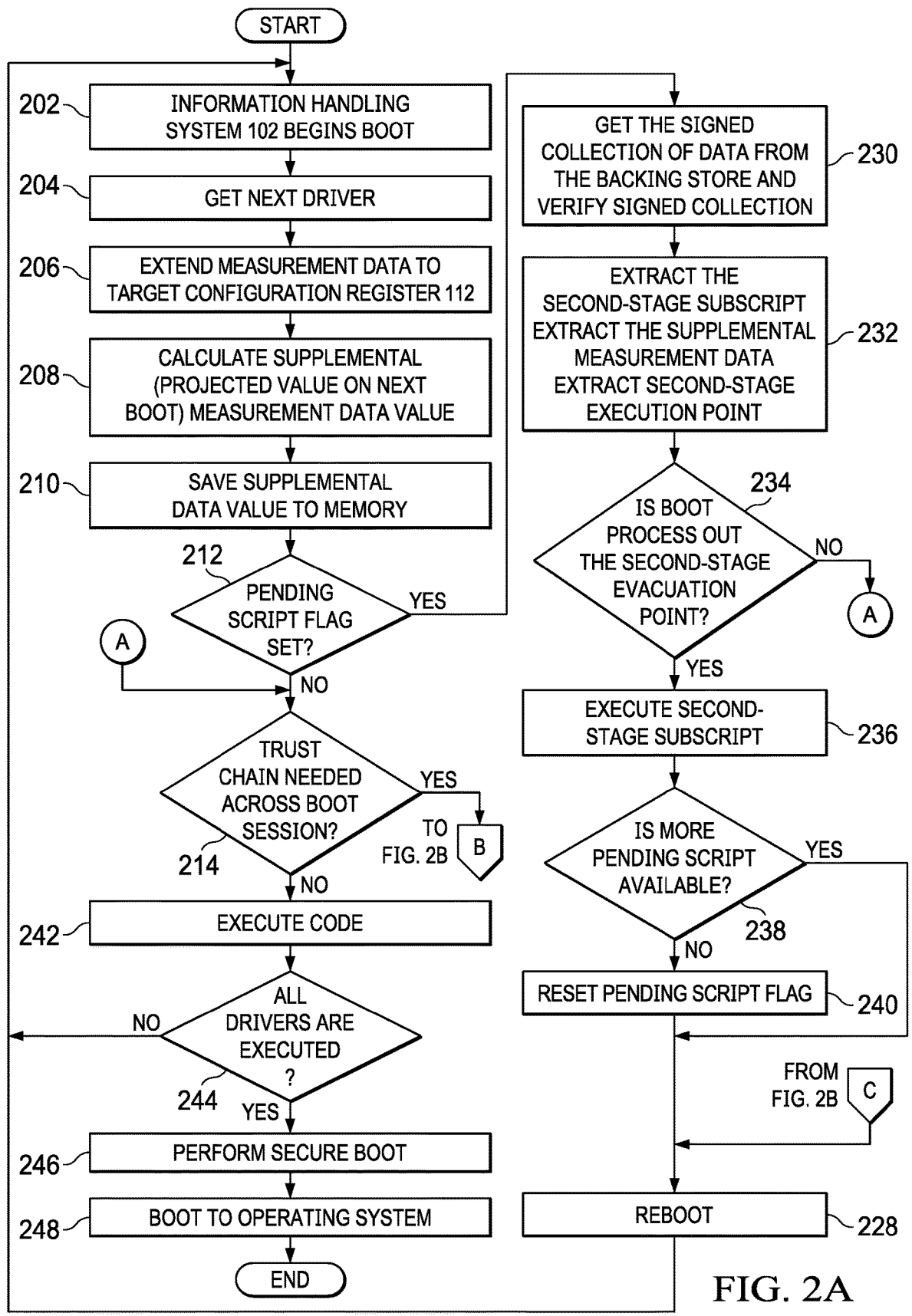
FIGS. 2A and 2B (collectively referred to herein as FIG. 2) illustrate a flow chart of an example method for extending security trust chaining to state changes between boot sessions of an information handling system, in accordance with embodiments of the present disclosure.
Figure 2B:
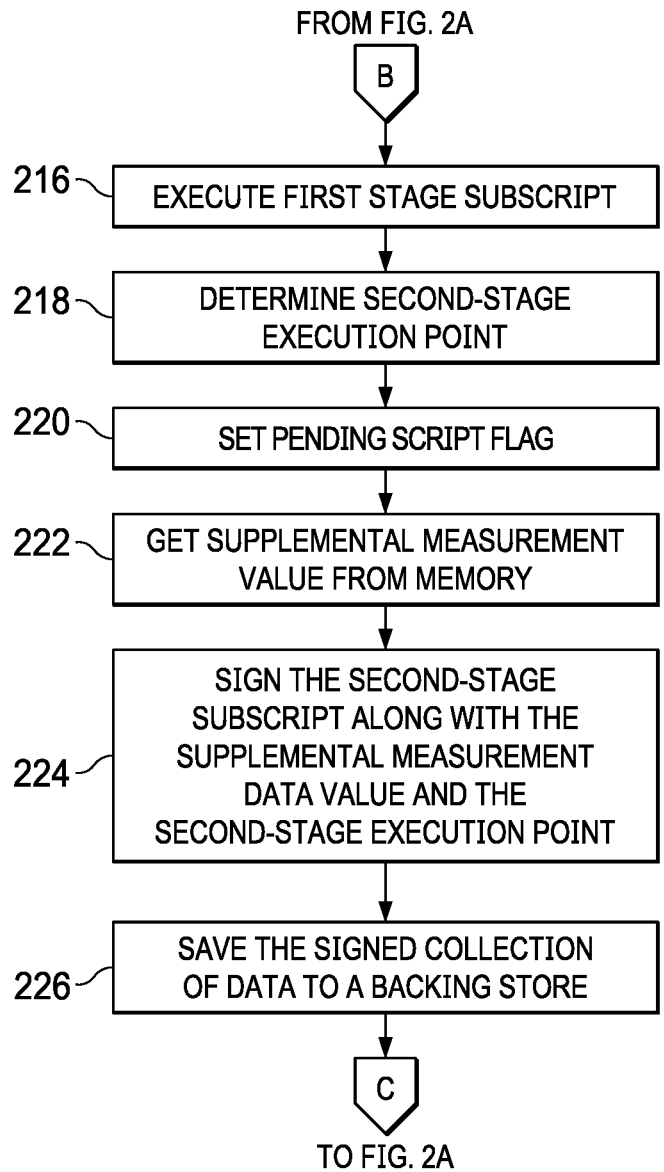

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a processor 103, a memory 104 communicatively coupled to processor 103, a BIOS 106 communicatively coupled to processor 103, a cryptoprocessor 114 communicatively coupled to processor 103, a network interface 118 communicatively coupled to processor 103, and one or more information handling resources 116 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 106 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 106 may be implemented as a program of instructions that may be read by and executed on processor 103 to carry out the functionality of BIOS 106. In these and other embodiments, BIOS 106 may comprise boot firmware configured to be the first code executed by processor 103 when information handling system 102 is booted and/or powered on. As part of its initialization functionality, code for BIOS 106 may be configured to set components of information handling system 102 into a known state, so that one or more applications (e.g., an operating system or other application programs) stored on compatible media (e.g., disk drives) may be executed by processor 103 and given control of information handling system 102.

As shown in FIG. 1, BIOS 106 may implement an update agent 108 to manage platform updates to information handling system 102, including without limitation, hardware changes, firmware updates, software updates, configuration changes, and/or any other changes to information handling system 102. As described in greater detail below, update agent 108 may operate in concert with cryptoprocessor 114 to extend security trust chaining to state changes between boot sessions of information handling system 102.

Cryptoprocessor 114 may be communicatively coupled to processor 103 and/or BIOS 106 (e.g., via a suitable communication bus) and may include any system, device, or apparatus configured to carry out cryptographic operations on data communicated to it from processor 103, BIOS 106, and/or another component of information handling system 102. In some embodiments, cryptoprocessor 114 may be compliant with the Trusted Platform Module specification, a successor specification, and/or any other similar specification. In some embodiments, cryptoprocessor 114 may be configured to generate random numbers, generate encryption keys (e.g., RSA keys), generate and maintain hash key tables of hardware and software components of information handling system 102, generate and maintain configuration parameters associated with hardware and software components of an information handling system, wrap (e.g., encrypt) keys, unwrap (e.g., decrypt) keys, and/or store keys (e.g., endorsement key, storage root key, attestation identity keys, storage keys).

As shown in FIG. 1, cryptoprocessor 114 may include configuration registers 112. In some embodiments, configuration registers 112 may include platform configuration registers (PCRs) compliant with the Trusted Platform Module specification, a successor specification, and/or any other similar specification. Configuration registers 112 may be used to securely store any relevant information, including without limitation secure storage relating to measurements of a configuration of information handling system 102 and its components, for use in creating a secure chain of trust, as described in greater detail below.

Network interface 118 may comprise any suitable system, apparatus, or device operable to serve as an interface between information handling system 102 and one or more other information handling systems via an in-band management network. Network interface 118 may enable information handling system 102 to communicate using any suitable transmission protocol and/or standard. In these and other embodiments, network interface 118 may comprise a network interface card, or "NIC."

Generally speaking, information handling resources 116 may include any component system, device or apparatus of information handling system 102, including without limitation processors, buses, computer-readable media, input-output devices and/or interfaces, storage resources, network interfaces, motherboards, electro-mechanical devices (e.g., fans), displays, and/or power supplies.

In operation, update agent 108 may work in concert with cryptoprocessor 114 to extend a trust chain between the boot sessions with respect to the creation of an update (e.g., event, state, and/or script) and consumption of such update (e.g., event, state, and/or script). Accordingly, update agent 108 may harden the security of information handling system 102 to reduce an attack surface vector for multi-boot updates.

For example, update agent 108 may perform trust chaining that utilizes the configuration registers 112 to extend trust chaining across multiple boots of information handling system 102. Configuration registers 112 may be used by update agent 108 to record a platform state of information handling system 102, including a state of system firmware, configuration, option read-only memories (ROMs), state of operating system loading, and/or any other suitable information regarding information handling system 102 or its components. Accordingly, configuration registers 112 may be used to record a temporary state change that may be verified upon a subsequent boot before proceeding to the next step in a chained, multi-boot update. Some operations of a complex configuration change or firmware update may require confirmation that the previous step occurred successfully, and to ensure that that state is properly recorded across system boot. If at any time, the trust chaining of the previous boot does not match the trust chaining of the next boot, update agent 108 may halt the update to ensure that only trusted scripts are executed in a correct, trusted sequence.

In a first stage, update agent 108 may launch an update script, and such update script may perform some action to update information handling system 102. If the update script must extend trust chaining to a subsequent boot to complete the script, update agent 108 may perform a process to ensure multi-boot trust chaining in connection with the update. In accordance with such process, update agent 108 may load the update script into BIOS 106 and determine if the update requires multiple boot sessions and also determine if trust chaining across multiple boot sessions is required. Update agent 108 may then load the update script into memory 104 and cause information handling system 102 to reboot in order to launch the update script.

Upon rebooting, update agent 108 may execute the update script and determine at which point during the boot process of information handling system 102 the update script executes (e.g., whether early in the boot process, or later). Update agent 108 may use such information to determine at which point during the boot process update agent 108 should extend trust chain measurement using configuration registers 112. Update agent 108 may then read a target configuration register 112 value at the point of the boot process in which it needs to perform its actions, and extend a supplemental measurement to the target configuration register 112. Update agent 108 may also save of copy of the supplemental measurement value to a non-volatile portion of memory 104.

Update agent 108 may then take the then-current value of the target configuration register 112 after the supplemental measurement is extended, and cryptographically sign the value along with the hash of a second-stage subscript of the update script to be performed in a subsequent boot session. Update agent 108 may save the second-stage subscript to a backing store (e.g., a non-volatile portion of memory 104, a hard disk drive, or a cloud service communicatively coupled to network interface 118). Update agent 108 may then reboot information handling system 102.

In a second stage, update agent 108 may determine if a pending script flag is set. If set, during an early portion of the boot process, update agent 108 may locate the second-stage subscript. Update agent 108 may then determine the point of the boot process, determined above, at which it is to measure trust chaining for the update, and update agent 108 may cause information handling system 102 to measure configuration of information handling system 102 at such point.

Update agent 108 may retrieve the supplemental measurement value from the non-volatile portion of memory 104 and extend it to the target configuration register 112 and attempt to verify the signature of the second-stage subscript. If update agent 108 successfully verifies signature of the second-stage subscript, thus confirming that the measurement of target configuration register 112 is correct, update agent 108 may cause execution of the second-stage subscript. If update agent 108 is unable to verify the signature of the second-stage subscript, update agent 108 may prevent execution of the second-stage subscript.

After actions of the second-stage subscript are performed, update agent 108 will determine if the update script includes a third stage requiring another reboot, and if so, may perform the same actions as it did in the first stage to extend a supplemental measurement to the target platform, use such value to sign a third stage subscript, save the supplemental measurement to a non-volatile portion of memory 104, and reboot information handling system 102. In a third stage, update agent 108 may attempt to verify the signature of the third-stage subscript, and execute the third-stage subscript if verified. Such process may continue for additional stages, as needed.

FIG. 2 illustrates a flow chart of an example method 200 for extending security trust chaining to state changes between boot sessions of information handling system 102, in accordance with embodiments of the present disclosure. According to one embodiment, method 200 may begin at step 202. As noted above, teachings of the present disclosure may be implemented in a variety of configurations of information handling system 102.

At step 202, information handling system 102 may begin boot. At step 204, update agent 108 may get the next driver to be executed in the boot process. At step 206, update agent 108 may extend measurement data to a target configuration register 112. At step 208, update agent 108 may calculate a supplemental measurement data value for the target configuration register 112 and at step 210 may save the supplemental measurement data value to memory 104.

At step 212, update agent 108 may determine if a pending script flag is set, indicating a need for second stage execution of an update script. If the pending script flag is set, method 200 may proceed to step 230. Otherwise, method 200 may proceed to step 214.

At step 214, update agent 108 may determine if an update requires trust chaining to a subsequent boot session of information handling system 102. If the update requires trust chaining to a subsequent boot session of information handling system 102, method 200 may proceed to step 216. Otherwise, method 200 may proceed to step 242.

At step 216, update agent 108 may cause execution of a first-stage subscript for an update. At step 218, update agent 108 may determine a point within the boot process for execution of a second-stage subscript for the update. At step 220, update agent 108 may set the pending script flag, indicating that a second-stage execution for the update is required.

At step 222, update agent 108 may obtain the supplemental measurement data value previously stored (e.g., at step 210) to memory 104. At step 224, update agent 108 may sign the second-stage subscript along with the supplemental measurement data value and a value indicative of the second-stage execution point. At step 226, update agent 108 may store the signed collection of data to a backing store (e.g., a non-volatile portion of memory 104, a hard disk drive, or a cloud service communicatively coupled to network interface 118). At step 228, update agent 108 may cause a reboot of information handling system 102. After completion of step 228, method 200 may proceed again to step 202.

At step 230, update agent 108 may obtain from the backing store the signed collection of data stored during the previous boot session (e.g., stored at step 226) and verify the signed collection. At step 232, update agent 108 may extract the second-stage subscript, the supplemental measurement data, and the second-stage execution point from the signed collection of data.

At step 234, update agent 108 may determine if the boot process is at the second-stage execution point determined in the previous boot session (e.g., at step 218). If the boot process is at the second-stage execution point determined in the previous boot session, method 200 may proceed to step 236. Otherwise, update agent 108 may prevent execution of the second-stage subscript and method 200 may return to step 214.

At step 236, update agent 108 may allow execution of the second-stage subscript.

At step 238, update agent 108 may determine if more pending update script is available. If more pending update script is available, method 200 may proceed to step 228. Otherwise, method 200 may proceed to step 240.

At step 240, update agent 108 may reset the pending script flag. After completion of step 240, method 200 may proceed to step 228.

At step 242, in response to a determination that a trust chain for an update is not needed across multiple boot sessions, update agent 108 may cause execution of the driver code. At step 244, update agent 108 may determine if all drivers have been executed. If all drivers have been executed, method 200 may proceed to step 246. Otherwise, method 200 may proceed again to step 202.

At step 246, BIOS 106 may perform secure boot of information handling system 102. At step 248, BIOS 106 may boot to an operating system of information handling system 102. After completion of step 248, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method comprising, on a basic input/output system (BIOS) comprising boot firmware configured to be the first code executed by a processor when an information handling system is booted and/or powered on and the boot firmware is configured to be executed prior to execution of an operating system of the information handling system, executing a hardware attestation verification application configured to:
during a first boot session of the information handling system comprising the BIOS, execute a first stage of an update to the information handling system and securely record a platform state record associated with beginning of execution of a second stage of the update; and
during a second boot session of the information handling system:
obtain the platform state record;
compare the platform state record to an actual platform state during boot process of the second boot session; and
determine that the platform state record fails to match the actual platform state during boot process of the second boot session and prevent execution of the second stage of the update and complete the boot process of the second boot session.

2. The method of claim 1, wherein:
the platform state record identifies a point of execution during a boot process of the first boot session defining the point as where, during the boot process of the second boot session, the second stage of the update should begin; and
the actual platform state identifies a point of attempted execution of the second stage of the update during the boot process of the second boot session at which an attempt to begin the second stage of the update occurs.

3. The method of claim 1, wherein:
the platform state record is based on contents of a configuration register of a cryptoprocessor of the information handling system at a point of execution during a boot process of the first boot session defining the point as where, during the boot process of the second boot session, the second stage of the update should begin; and
the actual platform state is based on contents of the configuration register of the cryptoprocessor at a point of attempted execution of the second stage of the update during the boot process of the second boot session at which an attempt to begin the second stage of the update occurs.

4. The method of claim 3, wherein:
the cryptoprocessor comprises a Trusted Platform Module; and
the configuration register comprises a platform configuration register of the Trusted Platform Module.

5. The method of claim 1, wherein recording a platform state record comprises:
cryptographically signing a script for executing the second stage of the update, a supplemental measurement data value associated with a configuration register of the cryptoprocessor, and a value associated with a point of execution during a boot process of the first boot session defining the point as where, during the boot process of the second boot session, the second stage of the update should begin to generate a signed collection of data; and
storing the signed collection of data to a data store.

6. The method of claim 5, wherein comparing the platform state record to an actual platform state during boot process of the second boot session comprises:
retrieving the signed collection of data from the data store; and
extracting the script, the supplemental measurement data value, and the value associated with the point of execution during the boot process of the first boot session from the signed collection of data.

7. An article of manufacture comprising:
a non-transitory computer readable medium; and
computer-executable instructions carried on the computer readable medium, the instructions readable by a processor, the instructions, when read and executed, for causing the processor to, during execution of a basic input/output system comprising boot firmware configured to be the first code executed by the processor when an information handling system is booted and/or powered on and the boot firmware configured to be executed prior to execution of an operating system of the information handling system:

during a first boot session of the information handling system comprising the BIOS, execute a first stage of an update to the information handling system and securely record a platform state record associated with beginning of execution of a second stage of the update; and during a second boot session of the information handling system:

obtain the platform state record;

compare the platform state record to an actual platform state during boot process of the second boot session;

if the platform state record matches the actual platform state during boot process of the second boot session, permit execution of the second stage of the update; and if the platform state record fails to match the actual platform state during the boot process of the second boot session, prevent execution of the second stage of the update.

8. The article of claim 7, wherein:

the platform state record identifies a point of execution during a boot process of the first boot session defining the point as where, during the boot process of the second boot session, the second stage of the update should begin; and the actual platform state identifies a point of attempted execution of the second stage of the update during the boot process of the second boot session at which an attempt to begin the second stage of the update occurs.

9. The article of claim 7, wherein:

the platform state record is based on contents of a configuration register of a cryptoprocessor of the information handling system at a point of execution during a boot process of the first boot session defining the point as where, during the boot process of the second boot session, the second stage of the update should begin; and the actual platform state is based on contents of the configuration register of the cryptoprocessor at a point of attempted execution of the second stage of the update during the boot process of the second boot session at which an attempt to begin the second stage of the update occurs.

10. The article of claim 9, wherein:

the cryptoprocessor comprises a Trusted Platform Module; and the configuration register comprises a platform configuration register of the Trusted Platform Module.

11. The article of claim 7, wherein recording a platform state record comprises:

cryptographically signing a script for executing the second stage of the update, a supplemental measurement data value associated with a configuration register of the cryptoprocessor, and a value associated with a point of execution during a boot process of the first boot session defining the point as where, during the boot process of the second boot session, the second stage of the update should begin to generate a signed collection of data; and storing the signed collection of data to a data store.

12. The article of claim 11, wherein comparing the platform state record to an actual platform state during boot process of the second boot session comprises:

retrieving the signed collection of data from the data store; and extracting the script, the supplemental measurement data value, and the value associated with the point of execution during the boot process of the first boot session from the signed collection of data.

13. An information handling system comprising:

a processor;

a cryptoprocessor communicatively coupled to the processor; and a basic input/output system (BIOS) comprising boot firmware configured to be the first code executed by the processor when the information handling system is booted and/or powered on and the boot firmware is configured to be executed prior to execution of an operating system of the information handling system, the BIOS embodied in non-transitory computer-readable media communicatively coupled to the processor and configured to, when loaded and executed by the processor:

during a first boot session of the information handling system, execute a first stage of an update to the information handling system and securely record a platform state record associated with beginning of execution of a second stage of the update; and during a second boot session of the information handling system:

obtain the platform state record;

compare the platform state record to an actual platform state during boot process of the second boot session;

if the platform state record matches the actual platform state during boot process of the second boot session, permit execution of the second stage of the update; and if the platform state record fails to match the actual platform state during the boot process of the second boot session, prevent execution of the second stage of the update and complete the boot process of the second boot session.

14. The information handling system of claim 13, wherein:

the platform state record identifies a point of execution during a boot process of the first boot session defining the point as where, during the boot process of the second boot session, the second stage of the update should begin; and the actual platform state identifies a point of attempted execution of the second stage of the update during the boot process of the second boot session at which an attempt to begin the second stage of the update occurs.

15. The information handling system of claim 13, wherein:

the platform state record is based on contents of a configuration register of the cryptoprocessor at a point of execution during a boot process of the first boot session defining the point as where, during the boot process of the second boot session, the second stage of the update should begin; and the actual platform state is based on contents of the configuration register of the cryptoprocessor at a point of attempted execution of the second stage of the update during the boot process of the second boot session at which an attempt to begin the second stage of the update occurs.

16. The information handling system of claim 15, wherein:

the cryptoprocessor comprises a Trusted Platform Module; and the configuration register comprises a platform configuration register of the Trusted Platform Module.

17. The information handling system of claim 13, wherein recording a platform state record comprises:
- cryptographically signing a script for executing the second stage of the update, a supplemental measurement data value associated with a configuration register of the cryptoprocessor, and a value associated with a point of execution during a boot process of the first boot session defining the point as where, during the boot process of the second boot session, the second stage of the update should begin to generate a signed collection of data; and
- storing the signed collection of data to a data store.

18. The information handling system of claim 17, wherein comparing the platform state record to an actual platform state during boot process of the second boot session comprises:
- retrieving the signed collection of data from the data store; and
- extracting the script, the supplemental measurement data value, and the value associated with the point of execution during the boot process of the first boot session from the signed collection of data.

* * * * *